Aug. 20, 1929.   C. J. DUNZWEILER   1,725,260
STORAGE BATTERY
Original Filed July 2, 1925
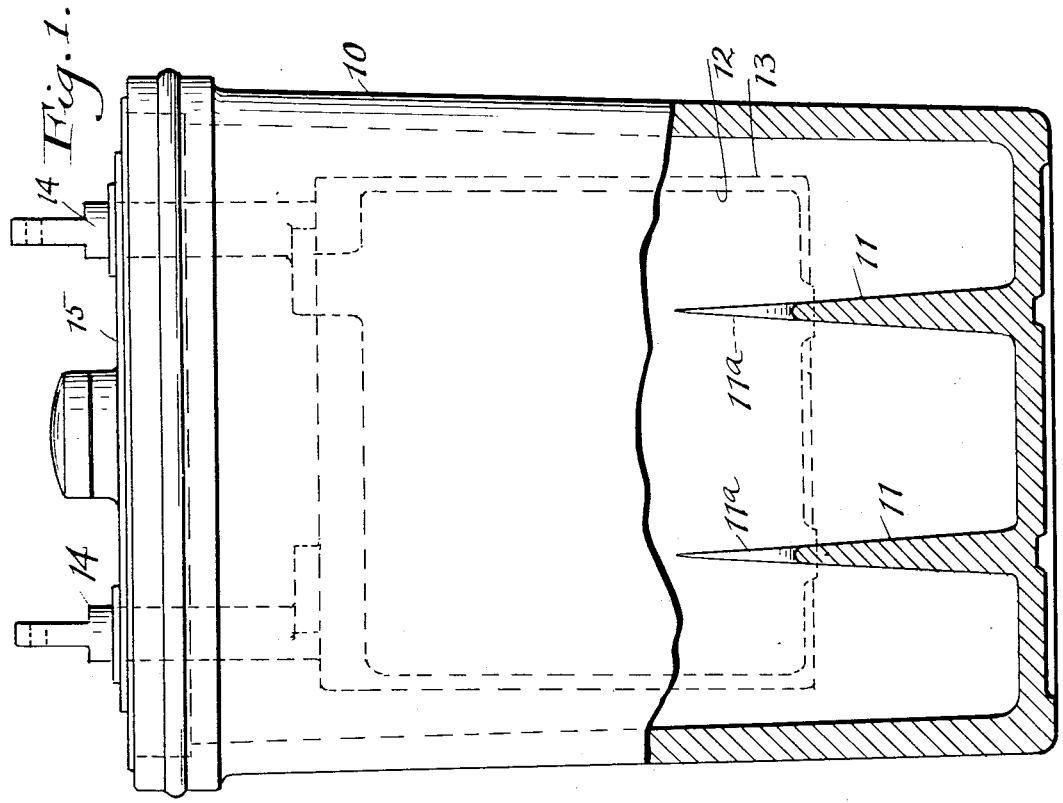
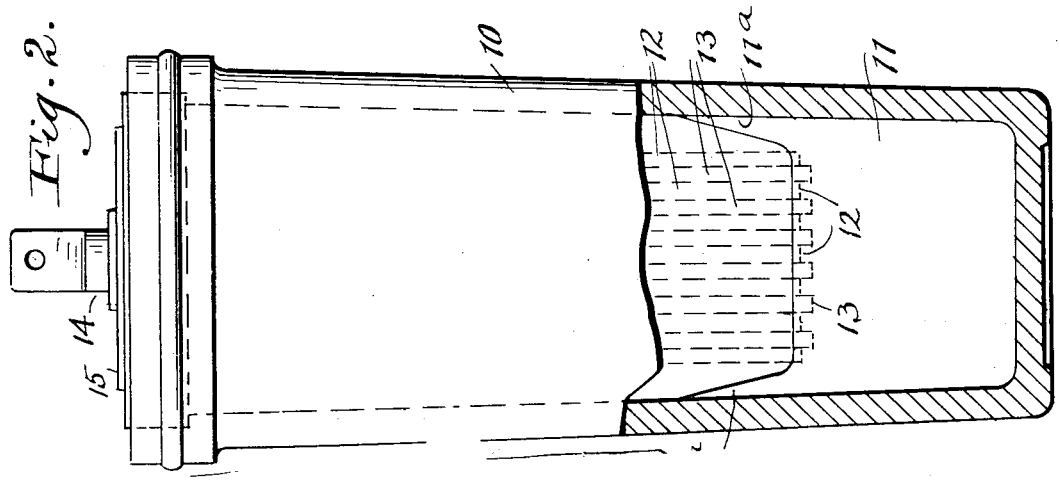
Inventor
Carl J. Dunzweiler Patented Aug. 20, 1929.

1,725,260

UNITED STATES PATENT OFFICE.

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

Application filed July 2, 1925, Serial No. 41,042. Renewed August 22, 1927.

This invention relates to improvements in storage batteries, and has for one of its objects to provide in the jar of a battery cell, and preferably in association with the bottom rests, element guides and centering means which serve to guide the element when inserted in the jar and to center it when the element is resting on the bottom rests.

Further the invention aims to form the guiding and centering means as portions of the bottom rests so that they will extend upwardly for a distance along the sides of the jar, and strengthen it.

The invention may be briefly summarized as consisting in certain novel details of construction, and combinations and arrangements of parts which will be described in the specification and set forth in the appended claims.

In the accompanying sheet of drawings wherein I have illustrated the preferred form and a modification of my invention, Fig. 1 is a side view of a cell with a portion of a jar in section; and Fig. 2 is an end view with the lower portion of the jar broken away.

Referring now to the drawings, 10 represents the jar of the cell, which may be formed of any suitable insulating material such as glass. Extending across the lower portion of the jar, from side to side thereof, are bottom rests 11, on which are supported the plates 12 and insulators or separators 13 of the battery element, the latter being composed of the usual assembly of positive and negative plates and insulators, the plates of the two groups being connected together in the usual manner and provided with suitable upstanding terminal posts 14, which extend through the cover 15 of the jar.

Additionally I provide means for guiding the element as it is inserted in the jar, and for centering it on the bottom rests 11. The guiding and centering means is preferably associated with the bottom rests 11, and in the preferred form of the invention consists of tapered extensions $11^a$ of the bottom rests, these extensions being formed integral with the bottom rests and sides of the jar and extending up along the sides, and merging therewith some distance above the bottom rests.

I prefer, however, that the guiding and centering means be formed integral with the bottom rests and sides of the jar, as shown in Figs. 1 and 2, for I find that when so formed they strengthen the jar, particularly when it is formed of glass, with the result that the percentage of jars cracked both in the process of forming the jars and while the cells are in use is greatly reduced.

Having described my invention, I claim:

1. A storage battery jar having a transverse bottom rest comprising a rib having tapered sides and formed integral with the sides and bottom of the jar and at its ends being extended upwardly along the sides of the jar, the extensions having sides tapered in conformity with the taper of the sides of the rest.

2. A storage battery jar having a transverse bottom rest comprising a rib formed integral with the sides and bottom of the jar and at its ends being extended upwardly along the sides of the jar, the rib including the extensions having tapered sides and the inner edges of the extensions being tapered outwardly from the top of the rib and merging with the sides of the jar.

3. A storage battery jar having a transverse bottom rest for battery elements, said bottom rest having end portions extending upwardly along the side walls of said jar, the inner edges of said end portions being inclined outwardly from substantially the top of said rest to merge with said side walls.

In testimony whereof, I hereunto affix my signature.

CARL J. DUNZWEILER.